United States Patent
Modesto et al.

(10) Patent No.: US 7,404,839 B2
(45) Date of Patent: Jul. 29, 2008

(54) FILTER ASSEMBLY AND ADAPTOR

(75) Inventors: Daniel P. Modesto, Plainfield, IL (US); David R. Sauer, Plainfield, IL (US)

(73) Assignee: TDC Filter Manufacturing, Inc., Cicero, IL (US)

( * ) Notice: Subject to any disclaimer, the term of this patent is extended or adjusted under 35 U.S.C. 154(b) by 229 days.

(21) Appl. No.: 11/378,854

(22) Filed: Mar. 17, 2006

(65) Prior Publication Data
US 2007/0214758 A1 Sep. 20, 2007

(51) Int. Cl.
*B01D 46/00* (2006.01)
(52) U.S. Cl. .............................. 55/502; 55/480; 55/510; 55/484
(58) Field of Classification Search .................. 55/324, 55/341.1, 369, 373, 378, 379, 480, 484, 490, 55/493, 496, 498, 502, 506, 508, 510
See application file for complete search history.

(56) References Cited

U.S. PATENT DOCUMENTS

| | | | |
|---|---|---|---|
| 3,078,650 A | | 2/1963 | Anderson et al. |
| 3,186,551 A | * | 6/1965 | Dornauf ..................... 210/243 |
| 3,577,486 A | | 5/1971 | Sebok |
| 4,209,310 A | * | 6/1980 | Berkhoel ..................... 96/426 |
| 4,218,227 A | * | 8/1980 | Frey ............................ 55/302 |
| 4,395,269 A | * | 7/1983 | Schuler ....................... 55/302 |
| 4,704,144 A | * | 11/1987 | LeBlanc et al. ............... 55/300 |
| 4,775,398 A | * | 10/1988 | Howeth ....................... 55/302 |
| 4,820,320 A | * | 4/1989 | Cox ............................ 55/302 |
| 4,871,380 A | * | 10/1989 | Meyers ........................ 55/483 |
| 4,955,996 A | * | 9/1990 | Edwards et al. ............... 55/302 |
| 5,062,872 A | * | 11/1991 | Williams ..................... 55/302 |
| 5,487,767 A | * | 1/1996 | Brown ......................... 55/357 |
| 5,562,746 A | | 10/1996 | Raether |
| 5,587,071 A | * | 12/1996 | Belden ....................... 210/232 |
| 5,803,941 A | * | 9/1998 | Berkhoel et al. .............. 55/498 |

(Continued)

OTHER PUBLICATIONS

PCT International Search Report in co-pending application No. PCT/US07/64207, mailed Oct. 16, 2007.
Donaldson Torit, "Downflo Oval 1 Dust Collectors", Donaldson Torit II, promotional material, (Sep. 1, 2002).

*Primary Examiner*—Duane Smith
*Assistant Examiner*—Robert A Clemente
(74) *Attorney, Agent, or Firm*—Schwartz Cooper Chartered (57) ABSTRACT

A device for adapting a cover for an existing air filter assembly to seal an end portion of a replacement cylindrical air filter having a round cross-sectional shape is disclosed. The cover has a plate with a radially inner convex guide separated from a radially outer convex guide by a concave receiver, a tightening member connected to the plate, and a catch having a first end movably connected to the tightening member, and the catch having a second end configured to engage a keeper, the tightening member adjustable to vary a distance between the catch and the plate. An adaptor is attachable to the plate of the cover. The adaptor has a first side for engagement with the plate and an opposing second side for engagement with an end portion of a cylindrical filter. The first side has a sealing surface extending radially inwardly from a peripheral edge. The sealing surface has a sufficient area to overlap a portion of the radially inner guide of the plate and a portion of the receiver when the adaptor is attached to the plate.

20 Claims, 6 Drawing Sheets

U.S. PATENT DOCUMENTS

| | | | |
|---|---|---|---|
| 5,895,510 A * | 4/1999 | Butler et al. | 55/490 |
| 5,954,849 A * | 9/1999 | Berkhoel et al. | 55/498 |
| 6,214,077 B1 * | 4/2001 | Bitner et al. | 55/490 |
| 6,364,921 B1 | 4/2002 | Raether et al. | |
| 6,368,388 B1 * | 4/2002 | Kosmider et al. | 95/273 |
| 6,368,390 B1 * | 4/2002 | Bitner et al. | 95/277 |
| 6,387,162 B1 | 5/2002 | Kosminder et al. | |
| 6,488,746 B1 | 12/2002 | Kosminder et al. | |
| 6,569,219 B1 * | 5/2003 | Connor et al. | 55/495 |
| 6,712,870 B1 | 3/2004 | Stamey, Jr. et al. | |
| 6,974,491 B1 * | 12/2005 | Kendall | 55/493 |
| 7,264,656 B2 * | 9/2007 | Kosmider et al. | 95/273 |

* cited by examiner

FILTER ASSEMBLY AND ADAPTOR

TECHNICAL FIELD

The invention relates to air filtering systems. More particularly, the present invention is related to an adaptor for attaching to an existing cover used to seal an existing air filter assembly housing, the adaptor conforming the existing cover to seal an end portion of a cylindrical filter element.

BACKGROUND OF THE INVENTION

Filtering assemblies for cleaning an air or gas stream carrying particulate matter typically include filter elements disposed within a housing. The particulate matter-carrying stream is passed through the housing so the particulates are captured and retained by the filter elements.

Cylindrical filter elements are commonly used in air filter assemblies to process dust particles from an air stream. In a standard design, an air filter assembly has a clean air chamber and a dirty air chamber. The two chambers are separated by a partition or wall, such as one made from sheet metal; such a wall is commonly referred to as a tube sheet. The tube sheet has a number of openings from which cylindrical filters are aligned. The filters suspend downwardly with or without an angle from the tube sheet openings into the dirty air chamber. Particulate-laden air is introduced into the dirty air chamber, and the particulates collect onto the filter. The filtered air passes through the filters to the interior of the filters, and upwardly out through the openings in the tube sheet into the clean air chamber. From the clean air chamber, the cleaned air is exhausted into the environment, or recirculated for further use.

Any particular filter assembly can have multiple filter constructions. The filter elements of a filter construction are supported by a frame or yoke attached to the tube sheet. The end of the filter is sealed with an access cover which is secured to the end of the yoke opposite the tube sheet.

It is periodically necessary to access the filter elements to determine whether maintenance or replacement of the filter elements is necessary. The replacement of used filter elements is a process that requires opening the access cover, removal of the filter elements, placement of different filter elements on the yoke, and replacement of the cover in such a way to ensure the proper amount of tightening of the cover onto the filter element(s). There are typically many covers on a housing corresponding with the number of filter elements in the filter assembly and the above process must be performed for each cover.

It is well-known in the art to use cylindrical filter element having a round sidewall. More recently, cylindrical filter elements having oval sidewalls have been introduced. The filter assemblies utilizing such oval filter elements are typically supplied with access covers conforming to the oval shape of the filter elements. Such a structure is described in U.S. Pat. No. 6,368,388.

For example, these access covers include a plate or sealing member, a catch and a tightening member. The plate is shaped and has a contoured surface capable of sealingly covering the end of an oval filter element. Accordingly, these plates include a first circumferential, outwardly convex, oval-shaped center portion or guide that fits within the end of an oval filter element. A circumferential, inwardly concave receiving surface is located radially outwardly of the convex guide. The receiving surface has a width sized to receive and seal the oval end cap of the oval filter element. A gasket for sealing the end cap may be included within the receiving surface. A second circumferential, outwardly convex, oval-shaped guide is separated from the first guide by the receiver, and ensures the end cap of the filter element is secure within the receiver. The plate also is shaped to sealingly interact with the front sheet of the filter assembly.

One problem associated with the filter assemblies utilizing oval filters is the filter assemblies are manufactured, as suggested above, to accept only oval filter elements. This is a problem because oval filter elements may not be readily available. Thus, it would be desirable to be able to adapt existing filter assemblies manufactured to accept only oval filters to accept filter elements of varying shapes, including round and oval.

The present invention is provided to solve the problems discussed above and other problems. A full discussion of the features and advantages of the present invention is deferred to the following detailed description, which proceeds with reference to the accompanying drawings.

SUMMARY OF THE INVENTION

One embodiment of the invention is directed to a device for adapting a cover for an existing air filter assembly to seal an end portion of a replacement cylindrical air filter having a round cross-sectional shape wherein the cover comprises a plate having a radially inner convex guide separated from a radially outer convex guide by a concave receiver, a tightening member connected to the plate, and a catch having a first end movably connected to the tightening member, and the catch having a second end configured to engage a keeper, the tightening member adjustable to vary a distance between the catch and the plate. The device has an adaptor attached to the plate of the cover. The adaptor includes a first side for engaging the plate and an opposing second side for engaging an end portion of a cylindrical filter. The second side has a sealing surface extending radially inwardly from a peripheral edge of the adaptor. The sealing surface has a sufficient area to overlap a portion of the radially inner guide of the plate and a portion of the receiver when the adaptor is attached to the plate.

In one aspect of the first embodiment, the second side has a substantially planar sealing surface. In another aspect of the this embodiment, the first side is locatable within the circumferential receiver of the plate. The first side has a mating surface comprised of an outwardly convex portion locatable within the concave receiver located on the plate of the cover. The mating surface includes an inwardly concave portion locatable over at least a portion of the radially inner guide of the plate of the cover. The mating surface further includes an outwardly convex portion locatable within the concave receiver located on the plate of the cover.

In another aspect of the first embodiment, the inwardly concave portion of the mating surface has a sufficient area to fully cover the radially inner guide of the plate when the adaptor is attached to the cover. The adaptor further comprises a central portion separating the first side from the second side. The central portion is produced from a polymeric material, such as a urethane.

In another aspect, the adaptor further comprises an aperture defining a passageway between the first and second sides. The adaptor can be a disk. This disk has an oval longitudinal cross-section.

In another aspect of the first embodiment, the device further comprises a means for attaching the adaptor to the plate of the cover. The means for attachment can include a layer of an adhesive for attaching the adaptor to the plate of the cover.

A second embodiment of the present invention is directed to a cover for an air filter assembly. The cover comprises a plate, a tightening member connected to the plate, a catch having a first end movably connected to the tightening member, an adaptor disk to seal an end portion of a cylindrical air filter having a round cross-sectional shape. The plate has a surface area with a first radially inner circumferential guide separated from a radially outer circumferential guide by a circumferential receiver. The catch has a second end configured to engage a keeper. The tightening member is adjustable to vary a distance between the catch and the plate. The adaptor disk is attached to the plate and at least partially covers the radially inner guide.

In another aspect of the second embodiment, the radially inner circumferential guide is outwardly convex and has an oval shape. The circumferential receiver is inwardly concave and has an oval shape. The radial outer circumferential guide is outwardly convex and has an oval shape.

In another aspect of the second embodiment, the adaptor has a first side for engagement with the plate and an opposing second side for engagement with an end portion of a cylindrical filter, the first side having a mating surface, the mating surface having an outwardly convex portion located within the circumferential receiver and an inwardly concave portion fully covering the radially inner guide of the plate, the second side of the adaptor having and having a substantially planar sealing surface extending radially inwardly from a peripheral edge of the adaptor wherein the sealing surface can be caused to seal the end portion of the cylindrical filter.

A third embodiment of the present invention is directed to an adaptor for attachment to an existing oval cover used to seal an existing air filter assembly housing. The adaptor conforms the existing oval cover to seal an end portion of a cylindrical round filter. The oval cover comprises a plate having a radially inner convex guide separated from a radially outer convex guide by a concave receiver, a tightening member connected to the plate, and a catch having a first end movably connected to the tightening member. The catch has a second end configured to engage a keeper. The tightening member is adjustable to vary a distance between the catch and the adaptor. The adaptor comprises a mating surface, an opposing sealing surface, and a central portion separating the mating surface from the sealing surface. The mating surface has an inwardly concave portion.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Air filter assemblies generally include a housing with a dirty air inlet and a clean air outlet. A tube sheet or spacer wall within the housing separates a clean air chamber from a dirty air chamber. A filter, or multiple filters, are supported within the dirty air chamber. As the air passes through the filter(s), the air is cleaned and then passes into the clean air chamber.

Figure 1:
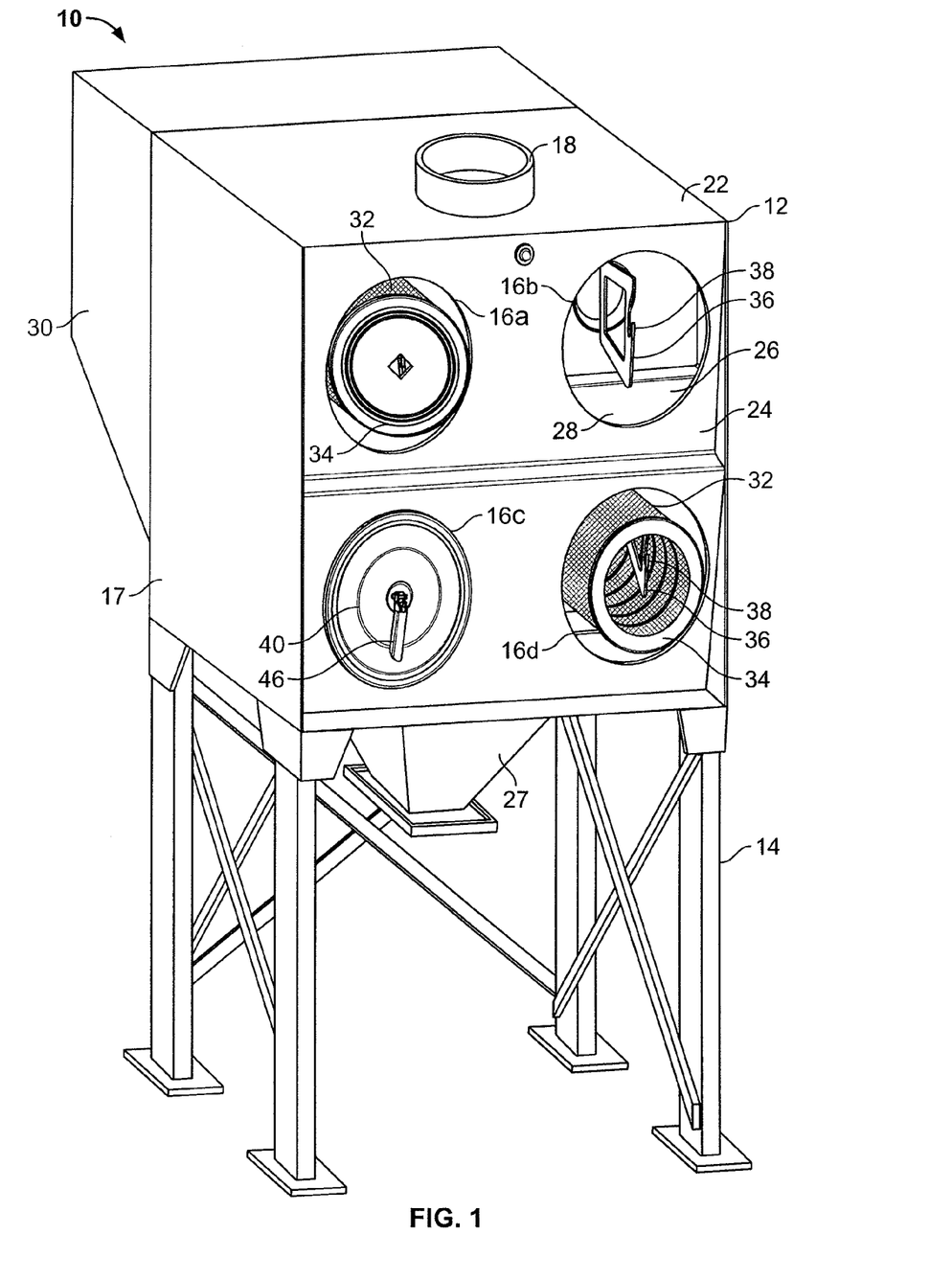
FIG. 1 is a perspective front view of an air filter assembly.

An air filter assembly, generally designated with reference number 10, is illustrated in FIG. 1. The air filter assembly includes a housing 12, a supporting frame 14, and four filter constructions 16a-d. The housing includes an air inlet 18 and an air outlet (not shown in FIG. 1). The housing 12 is of standard construction, and is generally made of sheet steel.

The housing 12 includes side panels 17, an upper panel 22, a front stepped panel 24, a back panel 26, and a bottom panel 27 defining a dirty air chamber 28. The dirty air chamber 28 is a sealed chamber in order to prevent any escape of contaminated air or fluid prior to its being filtered. The bottom panel 27 includes a collection area or hopper.

A clean air chamber 30 is located behind the dirty air chamber 28. The clean air outlet (not shown) is located on the clean air chamber 30.

The filter assembly 10 may include one or more filter elements 32. Filter elements 32 are cylindrical filter cartridges or any filter media that can remove particulates from the moving air. The individual filter elements 32 preferably are formed of pleated media, such as paper, formed into tube elements each having opposite ends. Each of these ends typically has an end cap 34. A filter element 32 can have any cross sectional shape. Many filter elements 32 are circular in cross sectional shape.

The filter elements 32 are supported in the dirty air chamber 28 by a yoke 36. A yoke 36 is any device, frame or supporting structure coupled or connected to the housing 12 which supports one or more filter elements 32.

The front end of the yoke 36 (the end opposite its rear end which attaches to the housing 12) includes a keeper 38 for engaging with a catch on a cover (described below). A keeper 38 is any device or protrusion capable of holding onto or engaging with another device referred to below and defined below as a catch. The filter elements 32 slide over the yoke 36.

A cover 40 is utilized to seal against the end cap 34 of the filter element 32 and to provide the appropriate amount of compression of the filter elements 32.

Figure 2:
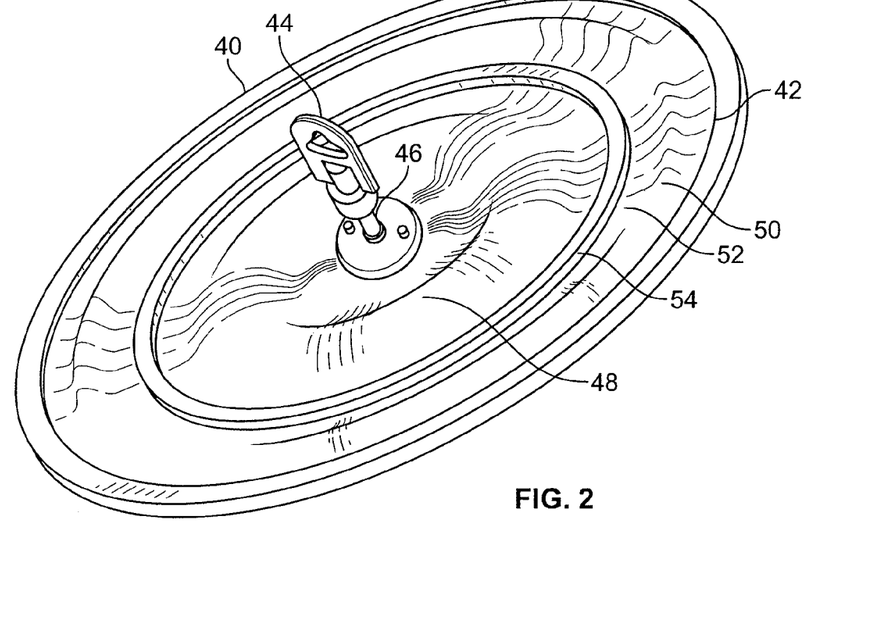
FIG. 2 is a perspective front view of an existing oval cover showing an oval plate with an oval gasket located within an inwardly concave, circumferential, oval receiver.
Figure 3:
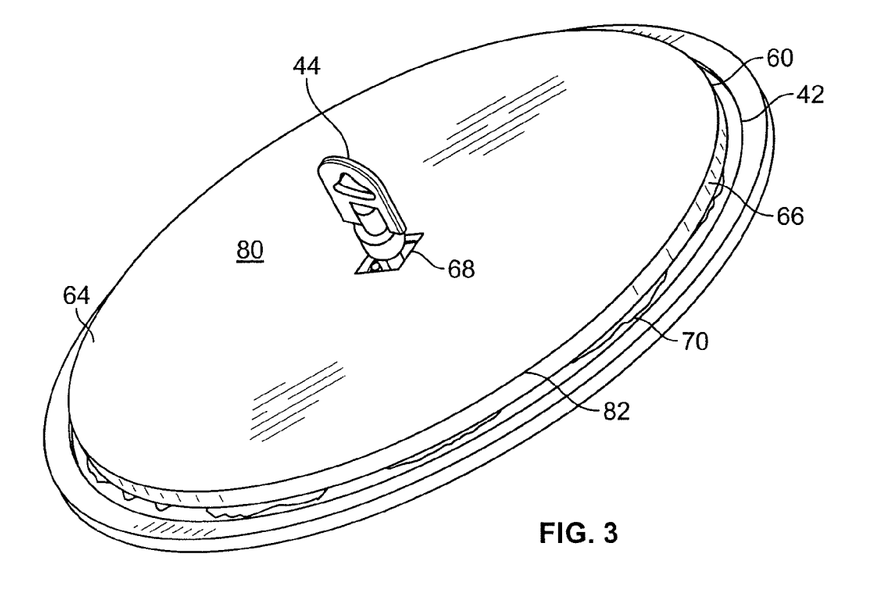
FIG. 3 is a perspective front view of an adaptor attached to the existing oval cover of FIG. 2.
Figure 4A:
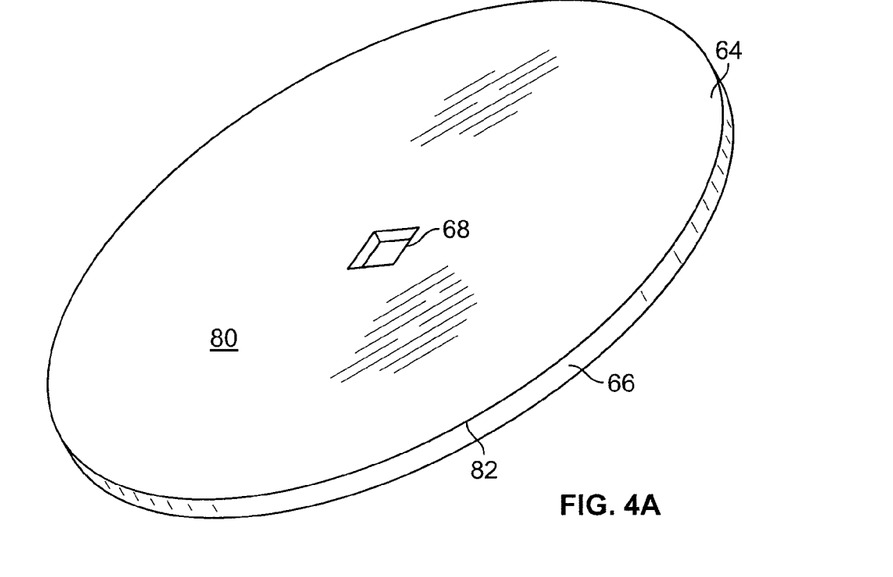
FIG. 4A is a perspective front view of the adaptor of FIG. 3 showing the sealing surface.
Figure 4B:
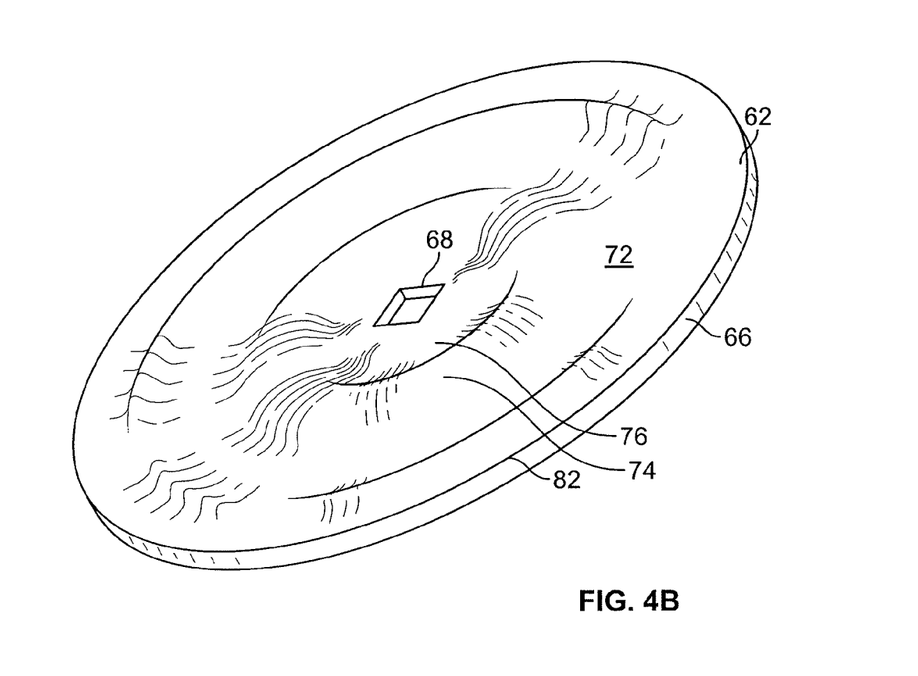
FIG. 4B is a perspective front view of the adaptor of FIG. 3 showing the mating surface.
Figure 5A:
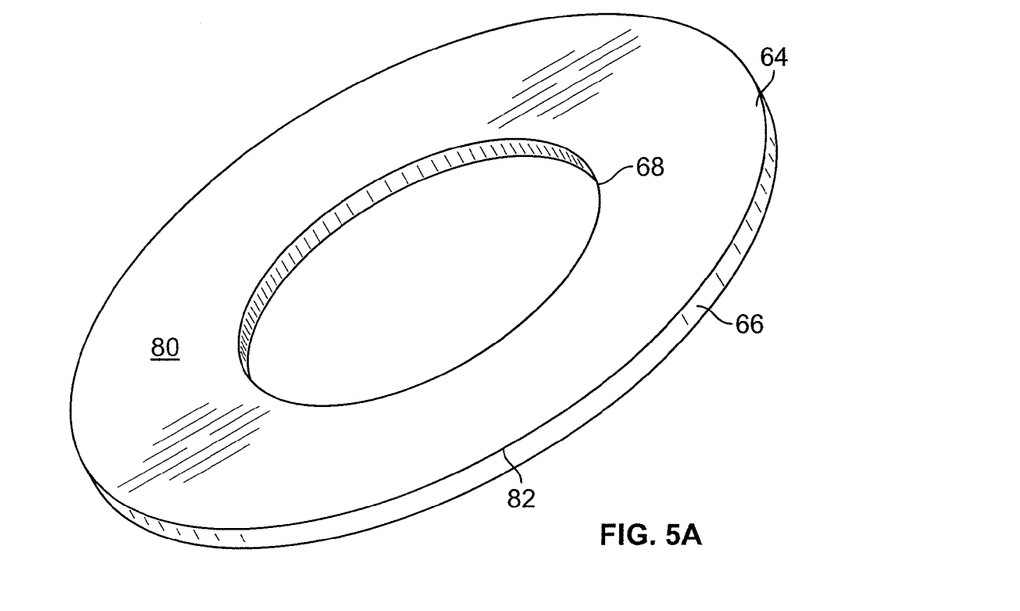
FIG. 5A is a perspective front view of an alternative adaptor showing the sealing surface.
Figure 5B:
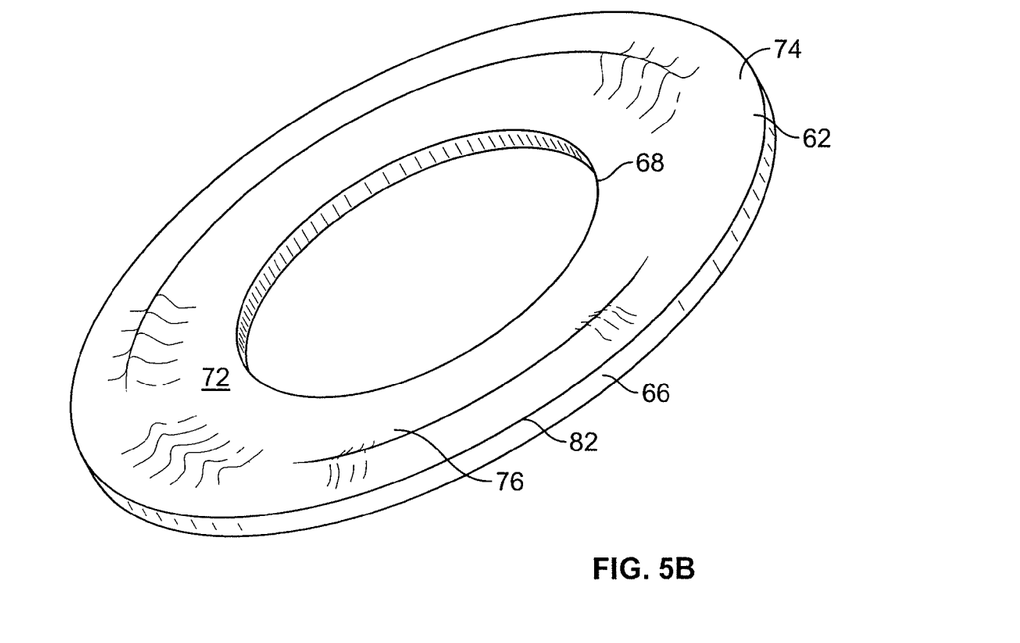
FIG. 5B is a perspective front view of an alternative adaptor showing the mating surface.

Referring to FIG. 2, the cover 40 includes a plate 42 or sealing member, a catch 44 and a tightening member 46. A plate 42 is a device capable of sealingly covering the end 34 of the filter element 32. In the present invention, the cover 40 is oval-shaped with a central axis at the geometric center of the cover 40. Likewise, the plate 42 is oval-shaped and includes a radially inner, outwardly convex, circumferential, oval guide 48 separated from a radially outer, outwardly convex, circumferential oval guide 50 by a circumferential, inwardly concave, oval receiver 52. Thus, the plate 42 is designed to receive the end cap 34 of an oval filter element 32. The plate 42 also includes a gasket 54 for sealing with end cap 34 of an oval filter element 32. The plate 42 also is shaped to sealingly interact with the front sheet 14. The plate 42 is typically made of sheet steel.

The catch 44 is any device or configuration capable of physically holding onto another device such as a keeper or protrusion. A catch can be used to hold onto a keeper or protrusion such that a force can be applied to the catch to move the catch and therefore move the keeper or protrusion because of the engagement of the catch with the keeper.

As briefly mentioned above, the cover 40 includes a tightening member 46. A tightening member 46 is any device or mechanism coupled to the catch 44 and a corresponding plate 42 such that the tightening member 46 is capable of changing the distance between the plate 42 and the catch 44. A tightening member 46 can be any type of clamp, bolt and nut combination, or other mechanism capable of adjusting the distance between the plate 42 and the catch 44.

Referring to FIGS. 3-7, an adaptor 60 for an existing oval cover 40 of an existing air filter assembly 10 is illustrated. The adaptor 60 is used to alter the oval cover 40 to allow the oval cover 40 to seal an end portion of a replacement cylindrical air filter having a round cross-sectional shape. The adaptor 60 may be a ring-shaped or disk-shaped, preferably an oval-shaped disk of a polymeric material, preferably urethane. The adaptor 60 comprises a first side 62 separated from an opposing second side 64 by a central portion 66. The adaptor further comprises an aperture 68 defining a passageway between the first and second sides 62,64 and a means for attaching the adaptor 62 to the plate 42, for example clamps, welding, screws, bolts, hook and latch, but preferably a layer of adhesive 70. The aperture 68 may be any shape but is preferably a parallelogram-shaped aperture as shown in FIGS. 4A and 4B, and more preferably a circular-shaped aperture as shown in FIGS. 5A and 5B.

Figure 6:
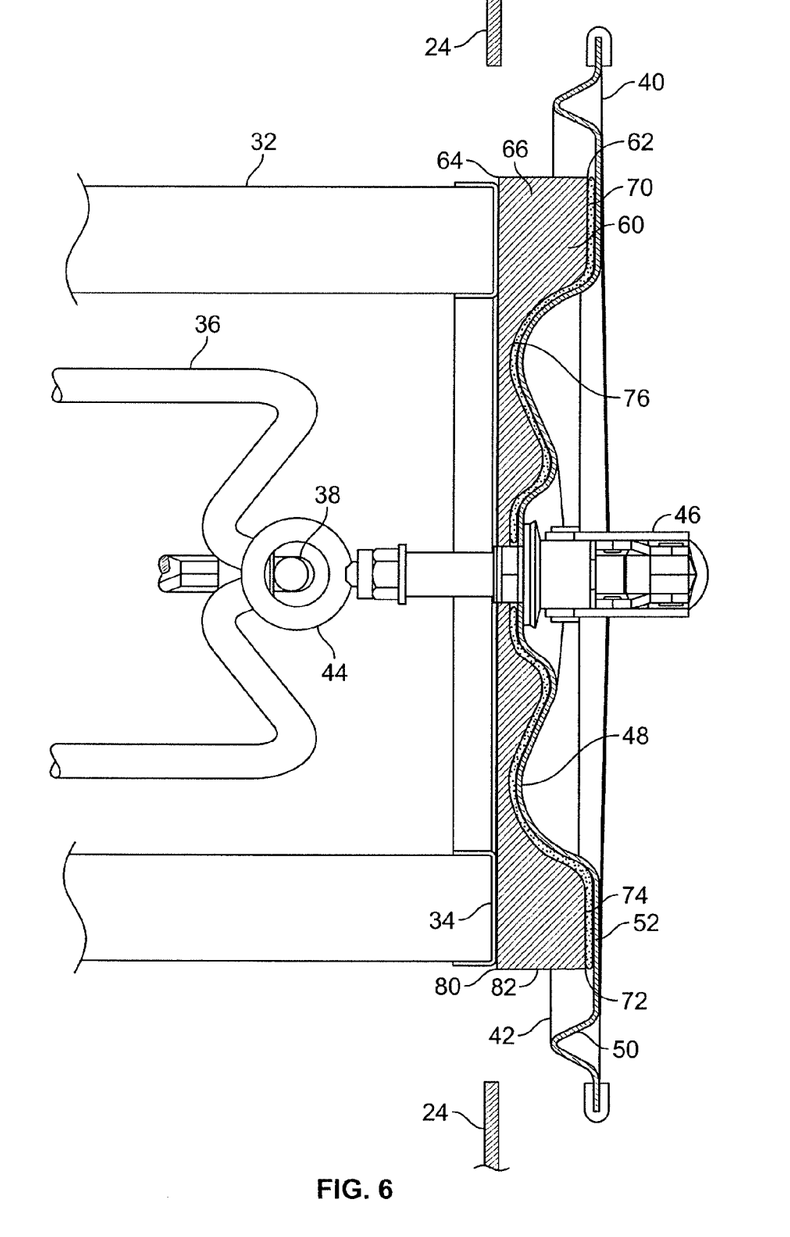
FIG. 6 is a cross-sectional side view of an existing cover having an adaptor attached thereto in an unsealed position; and, FIG. 7 is a cross-sectional side view of the existing cover of FIG. 6 with the cover sealingly engaging the end cap of a cylindrical filter element and the front panel of the air filter assembly.
Figure 7:
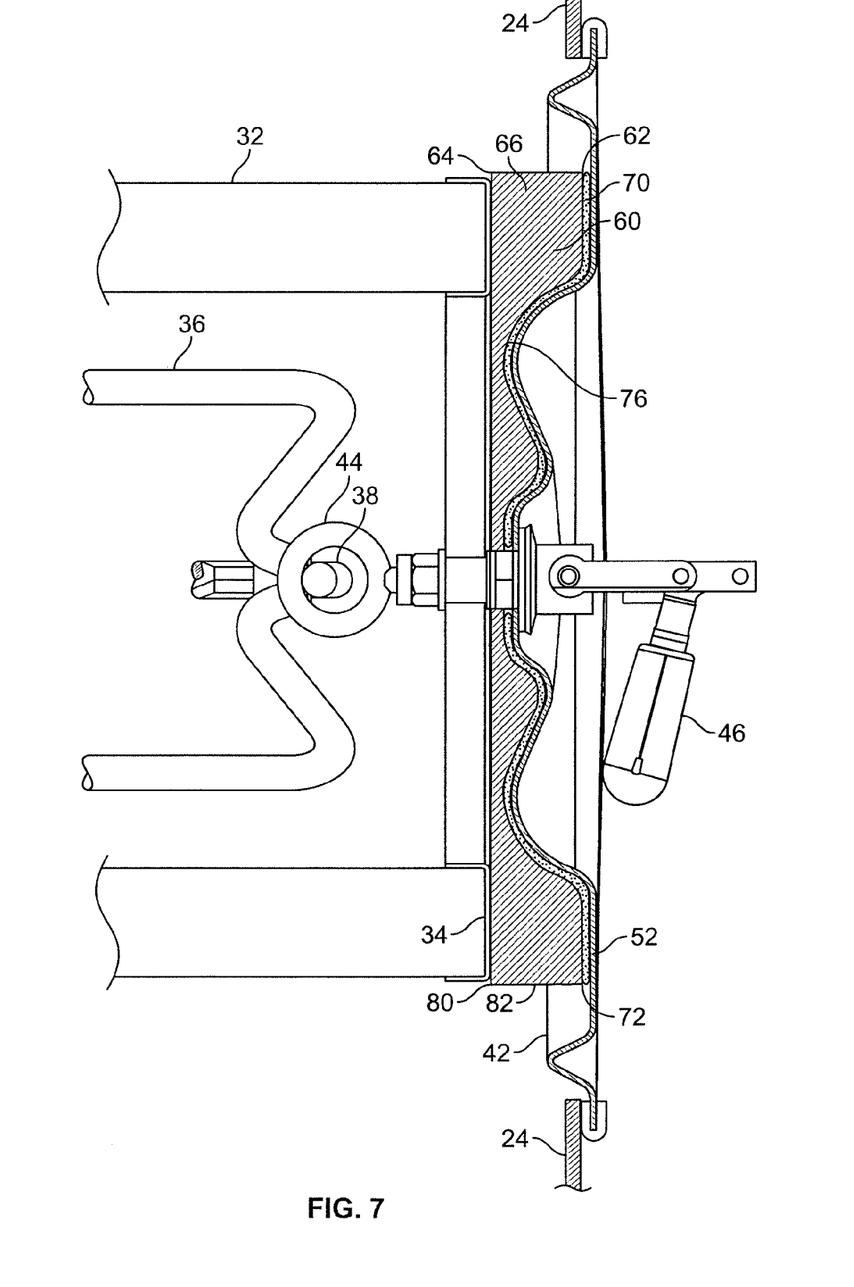

In use, the first side 62 engages the plate 42 after the gasket 54 is removed. A portion of the first side 62 is locatable within the circumferential receiver 52 of the plate 42. This portion is generally an element of a mating surface 72. The mating surface 72 has an outwardly convex portion 74 locatable within the concave receiver 52 located on the plate 42. The mating surface 72 further includes an inwardly concave portion 76 locatable over at least a portion of the radially inner guide 48 of the plate 42. This inwardly concave portion 76 preferably has a sufficient area to fully cover the radially inner guide 48 of the plate 42 when the adaptor 62 is attached to the cover 40. These portions 74,76 of the mating surface 72 preferably are shaped and dimensioned to mirror the receiver and the guides 48,52 to which the portions 74,76 are attached during use.

The second side 64 is for engagement with an end portion 34 of a cylindrical filter element 32. The second side 64 has a sealing surface 80 extending radially inwardly from a peripheral edge 82 of the adaptor 60. The sealing surface 80 has a sufficient area to overlap a portion of the radially inner guide 48 of the plate 42 and a portion of the receiver 52 when the adaptor 60 is attached to the plate 42. Engagement of the sealing surface 80 with the end cap of the filter element 32 can be caused to seal the end portion 34 of the cylindrical filter 32. Accordingly, the sealing surface 80 is preferably substantially planar (i.e. of sufficient flatness to achieve a seal with the end cap 34 of the cylindrical filter element 32).

While the specific embodiments have been illustrated and described, numerous modifications come to mind without significantly departing from the spirit of the invention, and the scope of protection is only limited by the scope of the accompanying Claims.

What is claimed is:

1. A device for adapting a cover for an existing air filter assembly to seal an end portion of a replacement cylindrical air filter having a round cross-sectional shape wherein the cover includes a plate having a radially inner convex guide separated from a radially outer convex guide by a concave receiver, a tightening member connected to the plate, and a catch having a first end movably connected to the tightening member, and the catch having a second end configured to engage a keeper, the tightening member adjustable to vary a distance between the catch and the plate, the device comprising:

an adaptor attachable to the plate of the cover, the adaptor comprising:
a first side for engagement with the plate; and,
an opposing second side for engagement with an end portion of a cylindrical filter and having a sealing surface extending radially inwardly from a peripheral edge, the sealing surface having a sufficient area to overlap a portion of the radially inner guide of the plate and a portion of the receiver when the adaptor is attached to the plate wherein the adaptor can be caused to seal the end portion of the cylindrical filter.

2. The device of claim 1 wherein the sealing surface is a substantially planar.

3. The device of claim 1 wherein a portion of the first side is locatable within the circumferential receiver of the plate.

4. The device of claim 1 wherein the first side has a mating surface, the mating surface comprising an outwardly convex portion locatable within the concave receiver located on the plate of the cover.

5. The device of claim 1 wherein the first side has a mating surface, the mating surface comprising an inwardly concave portion locatable over at least a portion of the radially inner guide of the plate of the cover.

6. The device of claim 5 wherein the mating surface further comprises an outwardly convex portion locatable within the concave receiver located on the plate of the cover.

7. The device of claim 6 wherein the inwardly concave portion of the mating surface has a sufficient area to fully cover the radially inner guide of the plate when the adaptor is attached to the cover.

8. The device of claim 1 wherein the adaptor further comprises a central portion separating the first side from the second side, the central portion produced from a polymeric material.

9. The device of claim 8 wherein the polymeric material is a urethane.

10. The device of claim 1 wherein the adaptor further comprises an aperture defining a passageway between the first and second sides.

11. The device of claim 1 wherein the adaptor is a disk.

12. The device of claim 11 wherein the disk has an oval longitudinal cross-section.

13. The device of claim 1 further comprising a means for attaching the adaptor to the plate of the cover.

14. The device of claim 13 wherein the means for attachment includes a layer of an adhesive for attaching the adaptor to the plate of the cover.

15. A cover for an air filter assembly comprising:
- a plate having a surface area with a first radially inner circumferential guide separated from a radially outer circumferential guide by a circumferential receiver;
- a tightening member connected to the plate;
- a catch having a first end movably connected to the tightening member, and the catch having a second end configured to engage a keeper, the tightening member adjustable to vary a distance between the catch and the plate; and
- an adaptor disk to seal an end portion of a cylindrical air filter having a round cross-sectional shape, the adaptor disk attached to the plate and at least partially covering the radially inner guide.

16. The cover of claim 15 wherein the radially inner circumferential guide is outwardly convex and has an oval shape.

17. The cover of claim 16 wherein the circumferential receiver is inwardly concave and has an oval shape.

18. The cover of claim 17 wherein the radially outer circumferential guide is outwardly convex and has an oval shape.

19. The cover of claim 17 wherein the adaptor has a first side for engagement with the plate and an opposing second side for engagement with an end portion of a cylindrical filter, the first side having a mating surface, the mating surface having an outwardly convex portion located within the circumferential receiver and an inwardly concave portion fully covering the radially inner guide of the plate, the second side of the adaptor having and having a substantially planar sealing surface extending radially inwardly from a peripheral edge of the adaptor wherein the sealing surface can be caused to seal the end portion of the cylindrical filter.

20. An adaptor for attachment to an existing oval cover used to seal an existing air filter assembly housing, the adaptor conforming the existing oval cover to seal an end portion of a cylindrical round filter, the oval cover comprising a plate having a radially inner convex guide separated from a radially outer convex guide by a concave receiver, a tightening member connected to the plate, and a catch having a first end movably connected to the tightening member, and the catch having a second end configured to engage a keeper, the tightening member adjustable to vary a distance between the catch and the adaptor, the adaptor comprising:
- a mating surface having an inwardly concave portion;
- an opposing sealing surface; and
- a central portion separating the mating surface from the sealing surface.

* * * * *